(12) United States Patent
Korall et al.

(10) Patent No.: US 6,735,736 B2
(45) Date of Patent: May 11, 2004

(54) METHOD FOR ENSURING ERROR-FREE TRANSMISSION OF A TELECOMMUNICATION SIGNAL INCLUDING TEMPORARY DATA CHANNELS

(75) Inventors: Eli Korall, Shimshon (IL); Ilan Halevi, Petach Tikva (IL)

(73) Assignee: ECI Telecom Ltd., Petach-Tikva (IL)

( * ) Notice: Subject to any disclaimer, the term of this patent is extended or adjusted under 35 U.S.C. 154(b) by 493 days.

(21) Appl. No.: 09/877,236

(22) Filed: Jun. 11, 2001

(65) Prior Publication Data

US 2002/0029368 A1 Mar. 7, 2002

(30) Foreign Application Priority Data

Jun. 11, 2000 (IL) .................................................. 136670

(51) Int. Cl.[7] ............................................. H03M 13/00
(52) U.S. Cl. ...................................... 714/776; 714/755
(58) Field of Search ................................ 714/776, 755, 714/756; 370/310.2, 395.56, 222

(56) References Cited

U.S. PATENT DOCUMENTS

| | | | |
|---|---|---|---|
| 6,577,594 B1 * | 6/2003 | Abbas et al. ................ | 370/222 |
| 2001/0004358 A1 * | 6/2001 | Colombo et al. ............ | 370/336 |
| 2001/0053225 A1 * | 12/2001 | Ohira et al. ................. | 380/239 |

OTHER PUBLICATIONS

ITUT-T Standard Recommendation G. 783, Jan. 1999.
"Higher Order VC-n Tandem Connection Monitoring Protocol: option 2", Standard Recommendation G.707, Annex D.
"Lower Order VC-n Tandem Connection Monitoring Protocol", Standard Recommendation G. 707, Annex E.
"VC-4-Xc/VC-4/VC-3 Tandem Connection Monitoring protocol: option 1", Standard Recommendation G.707, Annex C.

* cited by examiner

Primary Examiner—Albert Decady
Assistant Examiner—Joseph D. Torres
(74) Attorney, Agent, or Firm—Browdy and Neimark (57) ABSTRACT

A method for preventing errors in transmission of a telecommunication signal via a network domain, involves transmitting the signal as a succession of binary data frames via two border points in the network domain, and each of the frames comprises a parity array of bits assigned for parity check and a temporary use array of bits assigned to serve at least one temporary data channel between the two border points. The method comprises a) transmitting, via the temporary data channel, additional information between the two border points with performing operation of parity compensation at each of the border points, in the parity array of each of the binary frames, b) obtaining an external command to cease transmission of the additional information via the temporary data channel, and c) executing the external command with performing a procedure of the temporary channels compensation at the border points.

13 Claims, 4 Drawing Sheets

METHOD FOR ENSURING ERROR-FREE TRANSMISSION OF A TELECOMMUNICATION SIGNAL INCLUDING TEMPORARY DATA CHANNELS

FIELD OF THE INVENTION

The present invention relates to a method for preventing errors in transmission of binary data frames via a path in a telecommunication network, when so-called temporary data channels are formed/dropped in any network portion between two end points of the path. More particularly, the invention is applicable to transmission of binary data frames via networks based on SDH and SONET standards, for example for preventing errors which might appear in the network portions called tandem connections (TC).

BACKGROUND OF THE INVENTION

Modern telecommunication networks are adapted for transmitting data organized in binary data frames of various formats. Typical examples of such binary data frames are standard frames accepted in SDH, SONET and PDH data transmission technologies. However, other telecommunication technologies using parity check (e.g., BIP) for verifying data under transmission may utilize the proposed technique.

The Synchronous Digital Hierarchy (SDH) and its North-American equivalent, the Synchronous Optical Network (SONET), are the globally accepted, closely related and compatible standards for data transmission in the public wide area network (WAN) domain. Recently, SDH/SONET has also been adopted by the ATM Forum as a recommended physical-layer transmission technology for ATM (Asynchronous Transfer Mode) network interfaces.

SONET and SDH govern interface parameters; rates, formats and multiplexing methods; operations, administration, maintenance and provisioning for high-speed signal transmission. SONET is primarily a set of North American standards with a fundamental transport rate beginning at approximately 52 Mb/s (i.e., 51.84 Mb/s), while SDH, principally used in Europe and Asia, defines a basic rate near 155 Mb/s (to be precise, 51.84×3=155.52 Mb/s). From a transmission perspective, together they provide an international basis for supporting both existing and new services in the developed and developing countries.

For transmitting data, SDH and SONET use frame formats transmitted every 125 $\mu$s (8000 frames/s). Because of compatibility between SDH and SONET, their basic frames are similarly structured, but differ in dimension, which fact reflects the basic transmission rates of 155.52 and 51.84 Mb/s, respectively. To be more specific, a basic frame format of SDH is 9 rows of 270 bytes, or 2430 bits/frame, corresponding to an aggregate frame rate of 155.52 Mb/s. For SDH systems, the mentioned basic frame transmitted at the rate 155.52 Mb/s forms the fundamental building block called Synchronous Transport Module Level-1 (STM-1 which, according to SDH mapping scheme, contains a signal called AU-4 which, in turn, carries a signal VC-4). For SONET systems, the basic frame has dimensions of 9 rows by 90 bytes (270:3) and, being transmitted at the rate 51.84 Mb/s (155.52:3), forms the appropriate fundamental building block called Synchronous Transport Signal Level-1 (STS-1 containing AU-3 that carries a signal VC-3).

Each basic frame of SONET or SDH comprises an information portion called Information Payload and a service portion called Overhead (OH). Information payload is usually formed by virtual container signals VC4, VC3 and the like, and comprise a so-called POH (Path Overhead) portion predestined for various service and control functions.

One of the basic methods for controlling proper transmission of binary data frames is a so-called parity check. The parity check is a method of error-detection in the binary data transmission whereby an extra bit is added to a particular group of bits to be checked, which is adapted to make the sum of all the bits (always odd or always even). Instead, a parity array of several parity bits or even a parity byte can be appended to an array of bits or bytes. For example, a BIP8 procedure is one type of a widely known Bit Interleave Parity procedure, wherein each bit of a resulting BIP8 byte is a parity bit done across a specific bit position—e.g., bit 2 of the BIP8 byte is the parity of the $2^2$nd bit of all the bytes being checked, and so on. The parity check procedure traps errors in the following way. When a transmitting device frames a binary message, it counts a parity value of the message and appends to the message a selected parity array (bit, a number of bits, byte) with the parity value in it. The receiving end also counts a parity value of the received message and compares the result to the received parity value. If an error is detected, an alarm flag may be set and a retransmission may be requested.

U.S. patent application Ser. No. 09/418,219 filed Oct. 14, 1999 by the Applicant describes a situation where a binary frame transmitted from a transmitting end can be subjected to changes (which are not due to errors) before being received at the receiving end. For example, some reserve bits or bytes of the frame may be used as a data/voice/fax transmission channel for a call, which occasionally takes place in a portion of the network positioned between the transmitting and the receiving ends of the main telecommunication path. Such a channel is characterized by non-permanent presence of additional binary data in a portion of the binary frame, which is not occupied by the main message, and will be called a temporary data channel in this description. The temporary character of the channel is reflected both by the fact that transmission of the additional information may start and cease according to external commands, and by the fact that the channel may use only a portion of the path between the transmitting and the receiving end.

Another, more illustrative example of the temporary data channel can be found in the way of operation of so-called tandem connections (TC).

Figure 1:
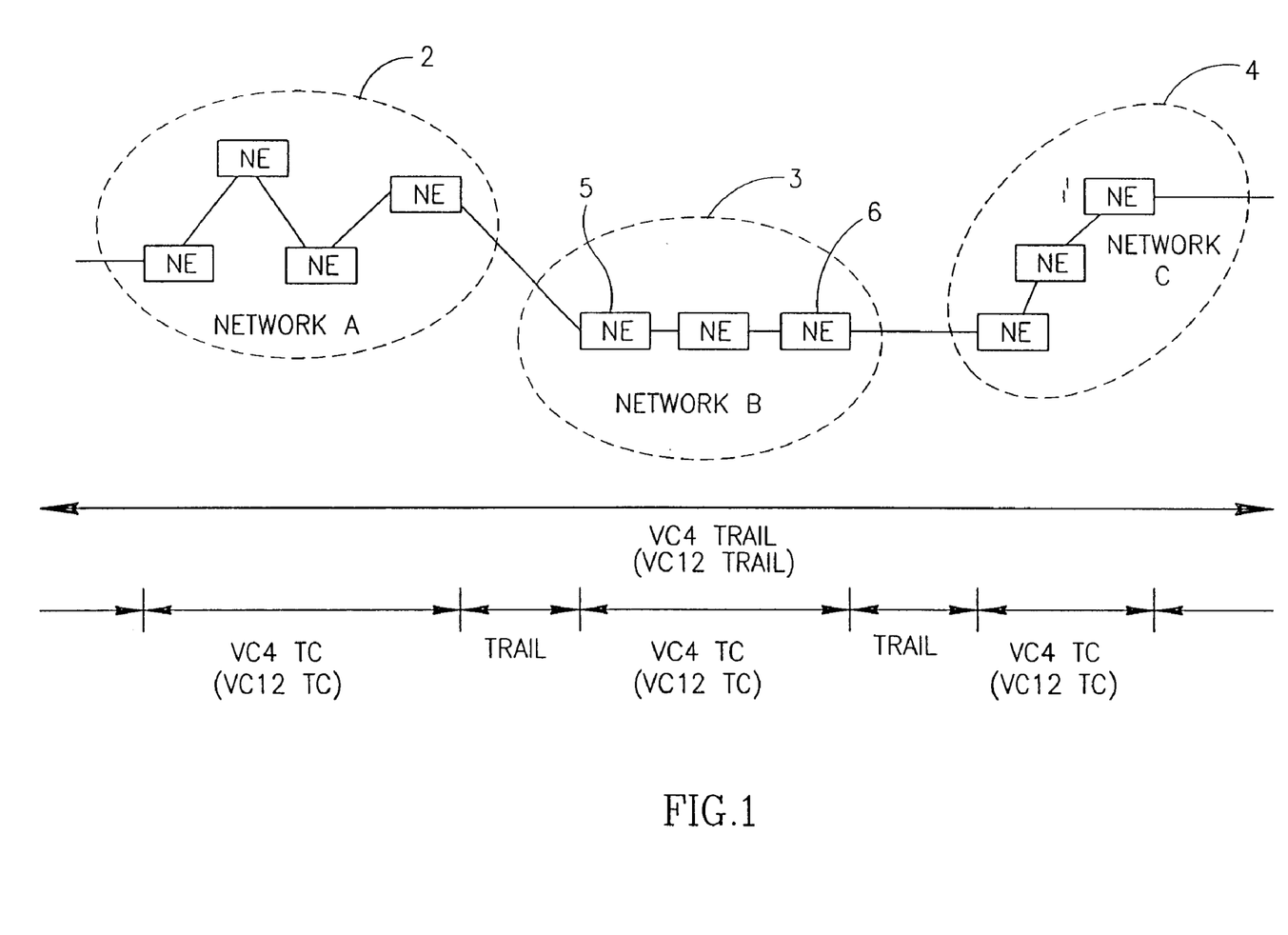
FIG. 1 schematically illustrates tandem connection domains.

FIG. 1 illustrates so-called network domains, each comprising a number of network elements (NE). Each network domain, which receives a telecommunication signal (trail) arriving from one neighboring network domain for transmitting it to another neighboring network domain, may be considered a Tandem Connection network domain.

When a data stream is transmitted from one network domain (being in possession or responsibility of one provider) to another network domain (held by another company or provider), such providers are supposed to share both benefits for the telecommunication service, and responsibility for errors and faults which may happen during the transmission.

In the example of FIG. 1, three network domains marked 2, 3 and 4 may serve for transmission there-through either a so-called high order SDH signal VC4, or a so-called low order SDH signal VC12, and each of the domains should be respectively considered either a high order Tandem Connection, or a low order Tandem Connection. Generally, the function of the Tandem Connection is to monitor only a specific overhead portion of the arriving trail (signal). For example, one of the TC functions is to count BIP errors-the binary errors revealed by the Bit Interleaving Parity procedure. BIP errors may comprise both the errors that came to the TC with the trail, and those occurred in the TC. The TC functions usually provide for distinguishing between defects occurred in the TC and those related to data received by the TC, and are finally aimed at obtaining objective information on responsibility of each specific network domain for errors introduced in a signal while transmitting it via this domain. In each TC network domain, one of the border network elements (NE) serves as a Tandem Connection source, and the other—as a Tandem Connection sink. In domain 3, for a particular direction of transmission, NE marked 5 is the TC source, and NE marked 6 is the TC sink. It is to be understood that the data transmission via the TC is bi-directional.

According to the term which will further be used in the present description, a temporary data channel is established between the TC source and the TC sink for creating and transmitting information which reflects the above-mentioned TC functions. An overhead byte N in the standard binary frame is assigned for this temporary data channel.

A Standard Recommendation No. G.707 (3/96) concerning SDH transmission systems, issued by the Telecommunication Standardization Sector of the International Telecommunication Union (ITU-T), describes functions of a Tandem Connection (TC) utilized in the network. In other words, the Standard Recommendation describes a case when the TC (an intermediate network domain with TC functions) is being switched into a telecommunication path, and stipulates which operations are to be performed at the TC for preserving errorless transmission over the path.

ITU-T Standard Recommendation G.783 (99/01) also describes Tandem Connection BIP compensation for higher order and lower order SDH data streams.

For example, according to the Standard G.707 (Annex D, VC-4/VC-3 Tandem Connection Monitoring Protocol; option 2), both the TC source and the TC sink should perform an operation of BIP-8 compensation for high order SDH signals, which operation is described in detail in section D.4 of the annex. Analogously, operation of compensation with respect to BIP-2 is to be performed in TC for lower order signals VC-2/VC-1 (Annex E of G.707), and with respect to yet other signals (Annex C). Monitoring protocols of Tandem Connections are standardized in the ITU-T Standard Recommendation G.707 (Annexes C, D, E) which are incorporated herein by reference.

The need in this operation can be explained as follows. Since inside the Tandem Connection there is a temporary data channel (byte N) which bears information that did not exist before the TC and should not be transmitted thereafter, the BIP value of any frame which has entered the TC will differ both from the BIP value of that frame before entering the TC and from the BIP value of that frame when leaving the TC. That's why, to prevent non-justified alarms due to discrepancies revealed by the parity check, any frame leaving a TC source or a TC sink network element must be treated for BIP compensation.

However, neither the G.707 Standard, nor any other relevant standard or patent document describes or suggests how an SDH/SONET signal transmitted via a Tandem Connection could be preserved from discrepancies at the moment when the TC functions are shut down (which may take place in practice upon an external command, for example upon a software instruction). In other words, no precautions are foreseen for the case when the signal from the upstream domain continues transmitting to the downstream domain via the same link in the intermediate domain which suddenly stops providing the Tandem Connection services (like via a direct communication link having no controlling/checking functions). Likewise, no information has been revealed as of how the similar problem is treated if another type of the temporary data channel is introduced in a data stream or dropped therefrom.

OBJECT OF THE INVENTION

It is therefore the object of the invention to provide a method that would ensure that the fact of shutting down a temporary data channel (for example, TC functions shut down) in a telecommunication path via which a data signal is transmitted does not bring extra errors to the signal. It should be emphasized that the invention is focussed on preventing the errors caused by the very fact of the shut down process; further errors of transmission which might appear in the path not carrying the temporary channel any more, are not in the scope of the present patent application.

SUMMARY OF THE INVENTION

The above object can be achieved by providing a method of preventing errors in transmission of a telecommunication signal via a network domain forming part of a network; wherein said signal is transmitted via two border points in said network domain in the form of a succession of binary data frames, each comprising a so-called parity array including one or more bits assigned for parity check and a so-called temporary use array including a number of bits assigned to serve one or more temporary data channels between the two border points, the method comprising steps of transmitting, via said temporary data channels, additional information between the two border points with performing operation of parity compensation at each of the border points, in the parity array of each of the binary frames, obtaining an external command to cease transmission of the additional information via said temporary data channels, and executing said command with performing a procedure of the temporary channels compensation at each of the border points.

The procedure of the temporary channel compensation can be performed as follows:

selecting a transient frame, performing said operation of parity compensation in the transient frame, and performing the very operation of the temporary channels compensating in the transient binary frame, and executing said command in a frame following the transient frame.

It should be clarified that the above-described operations are not necessarily synchronous at the two border points.

Preferably, the temporary use array of said transient frame can be used for the temporary channel compensation. Alternatively, other overhead bytes of the frame can serve the purpose.

In general, a plurality of temporary data channels may be established via a plurality of elements of the temporary use array, though the procedure of temporary channel compensation should be provided when the last of the temporary channels is going to be ceased.

The operation of parity compensation (which is known as BIP compensation in TC only) is provided in each binary frame outgoing from a particular border point, by introducing into its parity array a compensated parity value formed by summing a parity value of the corresponding frame which has entered said border point (the incoming frame), and a binary difference of information found in the temporary use arrays of a pair of binary frames which entered and left the same border point at a previous clock.

More particularly, the operation of parity compensation can be written down as follows:

$$B'_{(t)} = C_{(t-1)} \oplus B_{(t-1)} \oplus C'_{(t-1)} \oplus B'_{(t-1)} \oplus B_{(t)},$$

where:
- $\oplus$ is Exclusive OR operator. (This operator, being applied to initial binary vectors having "n" binary positions, gives a resulting binary vector having "n" binary positions, where each position of the resulting vector is equal to "1" if corresponding positions of the initial vectors give odd number of ones, and is equal to "0" if they give even number of ones. This operator is often used for detecting differences between two binary vectors).
- $C_{(t-1)}$—is a binary value (vector) in the temporary use array C of a frame incoming a border point;
- $C'_{(t-1)}$—is a value in the temporary use array of a corresponding frame outgoing from the border point;
- $B_{(t-1)}$—is a parity value in the parity array of a frame incoming a border point;
- $B'_{(t-1)}$—is a parity value in the parity array of a corresponding frame outgoing from the border point;
- $B_{(t)}$—is a parity value in the parity array of a next frame incoming the border point;
- $B'_{(t)}$—is a parity value in the parity array of a corresponding next frame outgoing from the border point, (this parity value is already compensated according to the formula).

The above equation can be rewritten as follows:

$$B'_{(t)} = [C_{(t-1)} \oplus B_{(t-1)} \oplus C'_{(t-1)} \oplus B'_{(t-1)}] \oplus B_{(t)} = B'_{(t)} = [\Delta(t-1)] \oplus B_{(t)},$$

where $[\Delta(t-1)]$—is a binary difference, introduced in frame (t−1) at a border point, which reflects additional information included in that frame.

According to one, most illustrative, version of the above method, said network domain is a Tandem Connection network domain, said temporary use array in the binary frame constitutes an overhead N-byte responsible for TC functions' records in the TC network domain, said parity array is an overhead B-byte, and the external command (for ceasing transmission of the information via said temporary data channel) is a command ordering that the Tandem Connection functions be shut down in the TC network domain via which the signal is being transmitted.

It should be explained that the above-mentioned overhead byte N of the SDH/SONET signal is a so-called TC byte which, if the TC functions are active, must be added/removed at a respective source/sink border point of the Tandem Connection. Byte N comprises a number of indications concerning various errors registered with the aid of the Tandem Connection functions. Among these indications there is usually a so-called IEC (Incoming Error Count), a TC-REI (errored blocks caused within the TC) and an OEI (errored blocks of the egressing frame).

Based on the above, it has been realized by the Inventors that when the TC ceases its functions (which is usually provided upon receiving a software command), contents of the transient frame, outgoing any border point of the network domain, should be corrected. The purpose of the correction is to prevent transmitting erroneous information related to functions of the TC, which just has stopped existing. Such erroneous information, if not prevented, will cause a distorted BIP result and generation of an alarm that actually reflects no more than the transition process of shutting down the TC. The same phenomena applies to ceasing transmission of information via another type of temporary data channel in a network domain.

The transient frame is preferably selected to be a first complete frame passing via a particular border point after said external command is obtained.

Preferably, the method comprises a single operation of the temporary channel compensation in the transient binary frame. However, no harm can be done if this operation is repeated a number of times in a number of successive frames, respectively.

The timing of the temporary channel compensation procedure can be selected so that the action achieves its purpose maximally effective. In principle, the operation of temporary channel compensation should be performed during the processing time of the transient frame, where the parity compensation is routinely provided. In practice, the two operations are prepared simultaneously but the parity compensation is performed before the temporary channel compensation, since usually the parity array is situated in the frame before a selected temporary use array.

The operation of temporary channel compensation can be provided according to the following equation proposed by the Inventors:

$$C'_{(t)} = C_{(t)} \oplus B_{(t)} \oplus B'_{(t)} = C_{(t)} \oplus [\Delta(t-1)],$$

where:
- $\Delta$—is Exclusive OR operator;
- $C_{(t)}$—is a binary value in the temporary use array C of a frame incoming a border point after receiving a command on the temporary channel shutdown (i.e., a transient incoming frame);
- $C'_{(t)}$—is a value in the temporary use array of the corresponding frame outgoing from the border point after receiving a command on the temporary channel shutdown (i.e., the transient ougoing frame);
- $B_{(t)}$—is a parity value in the parity array of a frame incoming a border point after receiving a command on the temporary channel shutdown (i.e., the incoming transient frame);
- $B'_{(t)}$—is a parity value in the parity array of a corresponding frame outgoing from the border point after receiving a command on the temporary channel shutdown (i.e., the outgoing transient frame), and wherein this parity value is already compensated;
- $[\Delta(t-1)]$—the binary difference reflecting additional information passed via the frame preceding the transient one.

As will further be shown in the detailed description, the binary value $[\Delta(t-1)]$ which has been used for parity compensation of the transient frame, should be used for the temporary channel compensation of the transient frame.

According to a second aspect of the invention, there is provided a network element capable of implementing the above-described method.

The most preferred embodiment of the network element is a source/sink TC element comprising a processor means designed for performing TC functions and further capable of providing the temporary channel compensation procedure of the signal upon obtaining an external command to shut down the TC functions. In the simplest implementation of the TC element, the proposed compensation is performed in the N-byte of the signal.

BRIEF DESCRIPTION OF THE DRAWINGS

The invention will be further illustrated and explained with reference to the following non-limiting drawings and using an example of SDH data streams.

FIG. 2b is an explanatory diagram to the block-scheme shown in FIG. 2a.

DETAILED DESCRIPTION OF PARTICULAR IMPLEMENTATIONS

FIG. 1 illustrates so-called Tandem Connection (TC) network domains.

According to the term accepted in the present description, a temporary data channel is established between the TC source and the TC sink for creating and transmitting information reflecting the TC functions; an overhead byte N in the standard binary frame is assigned for this temporary data channel.

The SDH/SONET signal can be either a high order data stream (VC-3, VC-4 of SDH), or a low order data stream (VC-2, VC-11, VC-12 of SDH, as well as VT streams of SONET), and said temporary use array is an overhead byte is either N2, or N1, respectively.

However, the method is applicable to any other network domains serving for transmitting any type of information (data/fax/voice) via a temporary data channel, and to any other signals composed as a succession of binary frames having overhead bytes, for example to PDH signals.

Moreover, there may theoretically exist one or more additional temporary data channels utilizing other predetermined bits/bytes of the standard binary frame and active between the border points of the network domain 3, i.e., between NE 5 and NE6. The whole array of bits/bytes used for the temporary data channels in the binary frame will then be considered a temporary use array. The method and the device according to the invention are proposed for compensating errors when temporary data channels stop working, namely when the last of the temporary data channels is shut down.

Figure 2A:
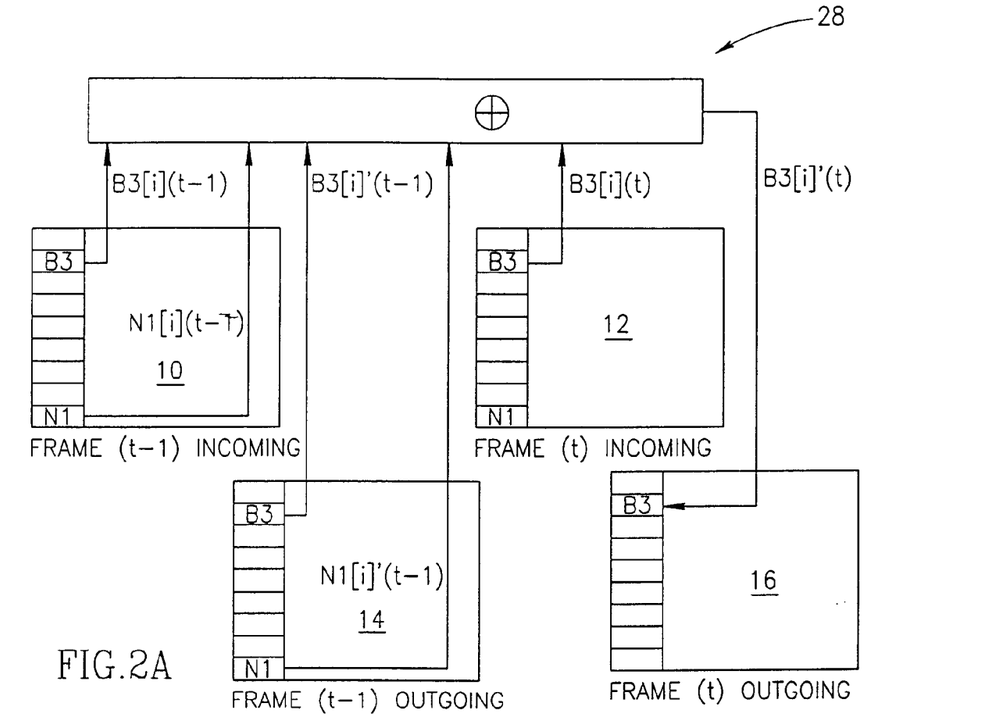
FIG. 2a (prior art) schematically shows how a Tandem Connection BIP compensation is provided in the BIP byte of a frame outgoing a TC source/sink network element, according to the Standard Recommendation G.783.

FIG. 2a (prior art) shows, using an example of higher order data streams, how the operation of BIP compensation is performed in a routine operation of a Tandem Connection, according to the ITU-T Standard G.783.

In the compensation procedure in TC, the following four standard frames of the trail will be referred to: two successive frames incoming a particular TC border element (say, a TC source element) and two corresponding to them successive frames outgoing the same TC element after being processed according to the TC functions. The mentioned standard frames are marked 10, 12, 14 and 16. It should be understood, that the incoming frame 10, after being processed in the border network element (TC source/sink), becomes the outgoing frame 14, and in the analogous manner—frame 12 becomes frame 16.

The diagram illustrated in FIG. 2a relates to a so-called BIP-8 parity check procedure, result of which is being preserved in an overhead byte B3 of high order SDH signals VC3 and VC4 (generally called VC-n). Other overhead bytes of the signal are schematically depicted as a right-hand column in each of the standard frames. One of the overhead bytes is byte N1, which serves for performing TC functions, if such are declared. For example, as we remember, N1 byte should comprise results of the parity check to enable distinguishing between external and internal binary errors. As stated by the Standard Recommendation G.707, D.4: "Since the BIP-8 parity check is taken over the whole virtual container VC-n (including byte N1), writing into N1 at the TC-source or TC-sink will affect the VC-n parity calculation. Because the BIP-8 parity should always be consistent with the current state of the VC-n, the BIP has to be compensated each time N1 byte is modified. Since the BIP-8 value in a given frame reflects the parity check over the previous frame, the changes made to BIP-8 bits in the previous frame shall also be considered in the compensation of BIP-8 in the current frame. Therefore the following equation shall be used for compensation of the individual bits in the BIP-8:

$$B3[i]'(t)=B3[i](t-1)\oplus B3[i]'(t-1)\oplus N1[i]'(t-1)\oplus B3[i](t)$$

Where:
B3[i]—is the existing B3[i] value in the incoming signal,
B3[i]'—is the new (compensated) B3[i] value which appears in outgoing frames,
N1[i]—is the existing N1[i] value in the incoming signal,
N1[i]'—is the new value written in to the N1 [i] bit (outgoing signal),
$\oplus$—is exclusive OR operator,
t—the time of the current frame,
t−1—the time of the previous frame. The current frame is marked with a pair of numbers 12 and 16, wherein 12 indicates a current incoming frame, and 16 is the same frame outgoing from the network element after being processed. The previous frame is marked with a pair of numbers 10 and 14 (10 is incoming, 14 is outgoing). Partial functions of the processor of the network element are schematically indicated with 28.

Figure 2B:
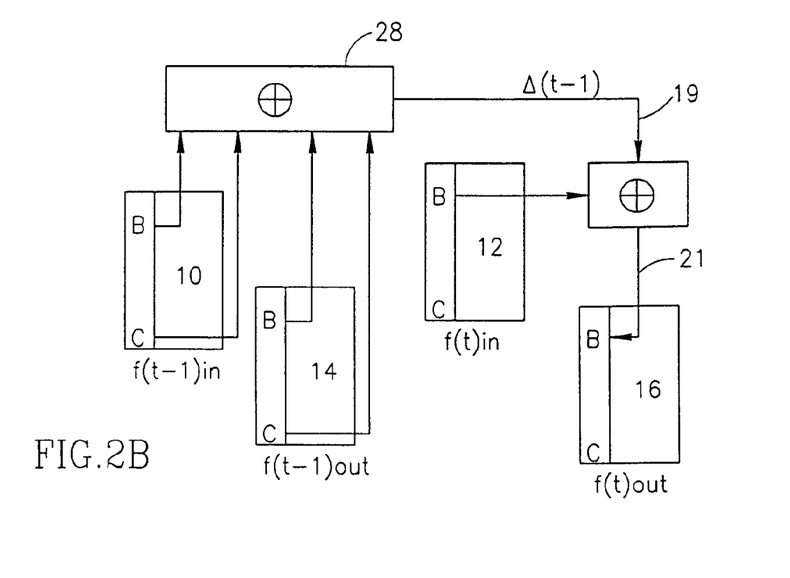

FIG. 2b illustrates the above diagram more schematically, thus generalizing it to any permanent data channel established via a network domain transmitting there-through a signal being a succession of binary frames. To make the example more illustrative and comprehensive with reference to FIG. 2a, the like binary frames are marked with like numbers. Let's assume, that a succession of incoming frames 10, 12 reaches a border network element of a network domain, where a temporary data channel is added to the signal. Let this channel is established using byte "C" (a temporary use array) of the frame, so that the successive outgoing frames 14 and 16 will bear information which did not exist before. Since each frame comprises a parity value in the parity array (byte marked B), which is checked at each clock by calculating parity over the whole previous frame, the comparison (if directly performed) should give an error because an additional information has been introduced into the temporary channel "C". To avoid it, the parity value in every outgoing frame is compensated by the processor of the border network element as follows. A binary difference between the previous incoming frame 10, and the previous outgoing frame 14 is obtained (see the arrow marked 19), and this difference is further summed up with the parity value of the following incoming frame 12, to be introduced in the B byte of the next frame 16 (by arrow 21), thereby compensating the changes introduced by the temporary channel.

The above-described parity compensation performed in the border element during its functioning (as a TC source/sink, or as a Network Element adding/removing another temporary data channel) is actually the reason why a new compensation is required when the temporary data channel disappears.

Figure 3A:
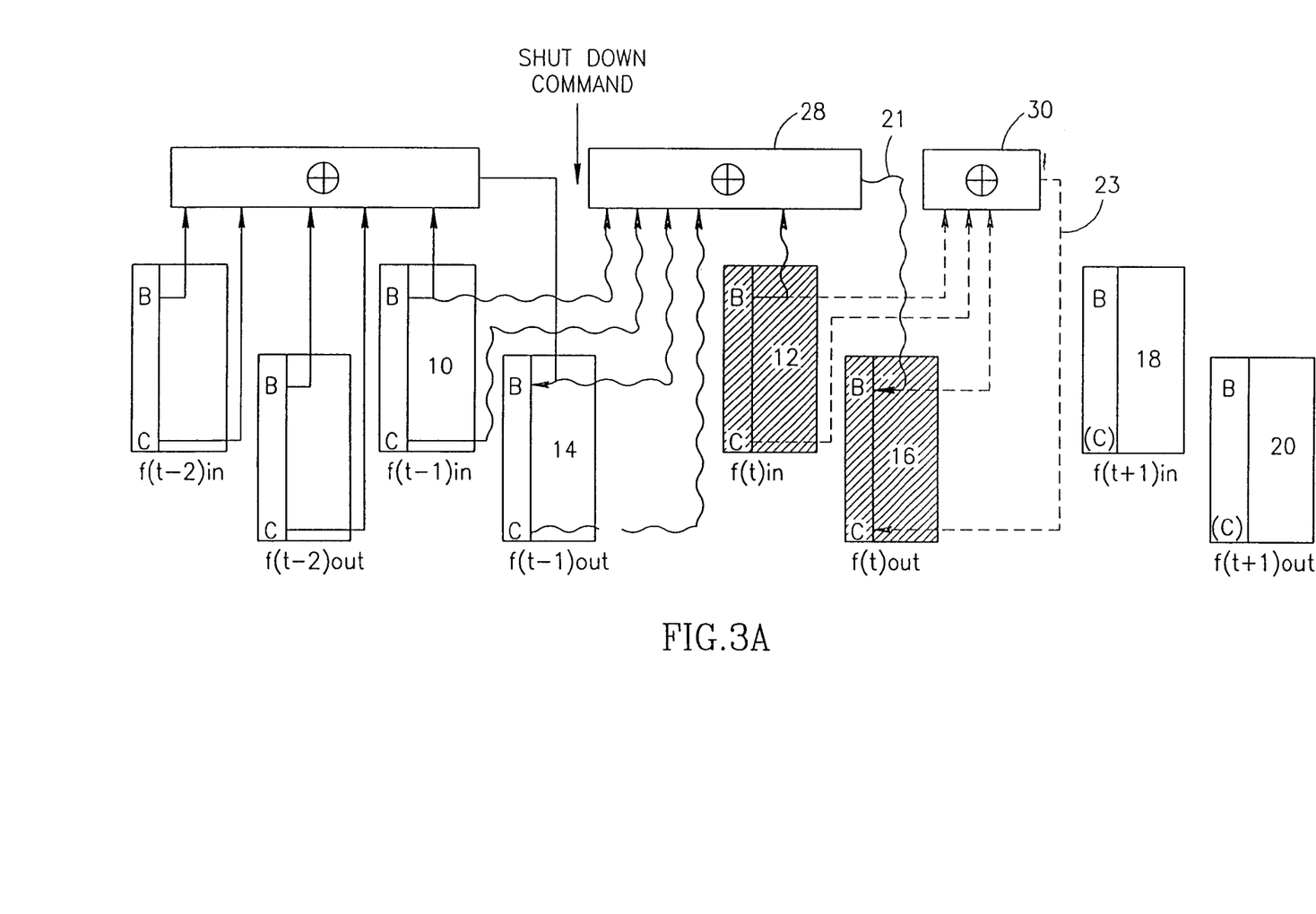
FIG. 3a is an explanatory diagram of the method according to the invention.

FIG. 3a illustrates schematically, how the temporary channel compensation can be performed if, during the process of transmission, an external command is obtained ordering to shut down the temporary channel. Suppose, frames at a clock (t−1) marked (as above) 10 and 14 are respectively the incoming and the outgoing frame at a "source" border element. Frame 14 bears the information in the temporary channel "C" and has a compensated parity array. Suppose, the shut-down command is obtained before the moment when the next frame (t) marked 12 enters the border element. It would be desired that the next outgoing frame 16 does not include the information in the temporary channel "C". It is also desired that errors be prevented in the parity check of both the transient frame, and the following outgoing frames.

However, if, immediately obeying the shutdown command, the parity compensation (see arrow 21) is not provided in the parity (B) array of the frame 16, the parity check will cause an alarm, since frame 14 still has additional information in the array C. On the other hand, if the parity compensation is done in frame 16, it will be necessary to continue compensating it in the following frames of the succession (20 and so on) to maintain the parity. Frames at a clock (t+l) are marked 18 (the incoming) and 20 (the outgoing). This situation would contradict the shut-down command which requires that all the TC functions be stopped.

To resolve the problem, the difference which was introduced in the B- array, should be compensated by introducing the equal binary value in the transient frame (for example, into its C array).

In other words, it is proposed to perform the parity (B-) compensation (marked 21) in the transient frame 12–16 (marked by hatching), and introduce into the C array of the transient outgoing frame 16 a compensating value (marked by arrow 23) which is formed as follows:

$$C'_{(t)} = C_{(t)} \oplus B_{(t)} \oplus B'_{(t)},$$

where $$B'_{(t)} = [C_{(t-1)} \oplus B_{(t-1)} \oplus C'_{(t-1)} \oplus B'_{(t-1)}] \oplus B_{(t)} = [\Delta(t-1)] \oplus BIP_{(t)}.$$

It means that $$C'_{(t)} = C_{(t)} \oplus BIP_{(t)} \oplus [\Delta(t-1)] \oplus BIP_{(t)}; \text{ and since } BIP_{(t)} \oplus BIP_{(t)} = 0,$$
$$C'_{(t)} = C_{(t)} \oplus [\Delta(t-1)].$$

It can now be understood that the same value which was introduced to compensate the BIP array, is to be introduced to compensate the C array. Additional proposed functions of the processor of the border network element are schematically marked 30.

Figure 3B:
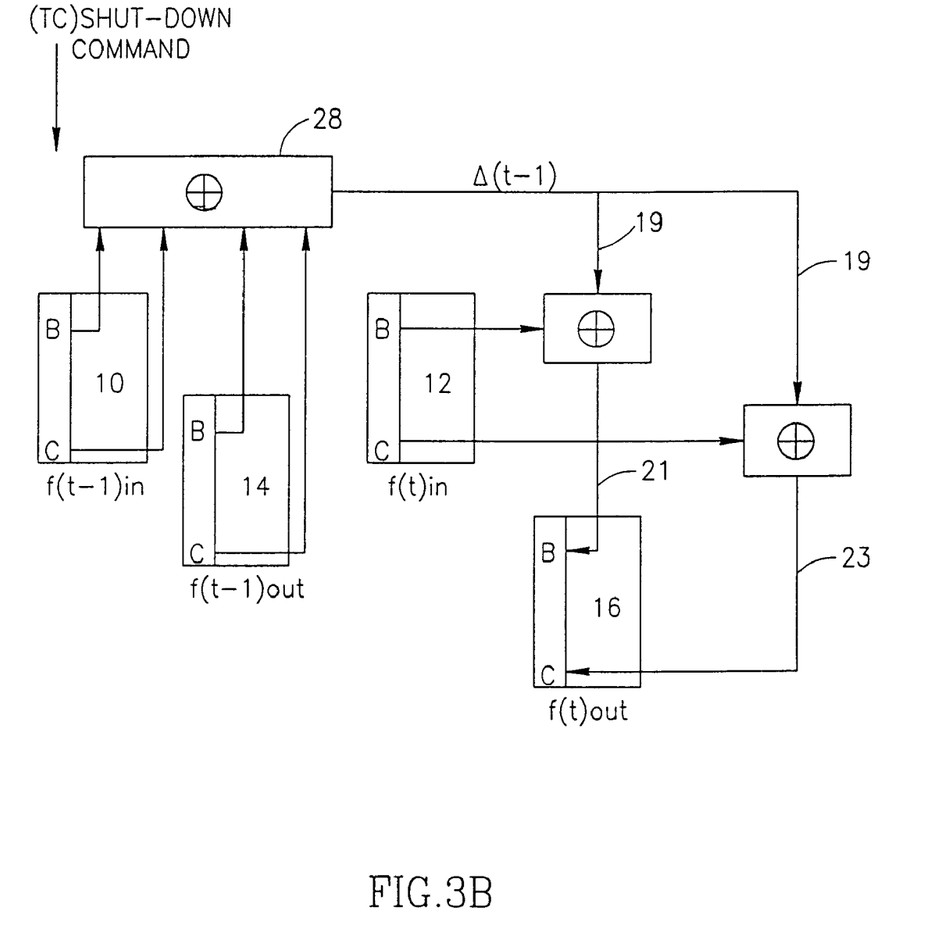
FIG. 3b schematically illustrates, using the diagram shown in FIG. 2a, how the method of the invention can be performed in case of the TC functions' shutdown, to prevent appearance of extra binary errors.

The above conclusion is illustrated in FIG. 3b in the form of a simplified block-diagram. As can be seen in FIG. 3a and FIG. 3b, both the regular parity compensation and the additional temporary channel compensation procedures should be performed during the processing of the transient frame.

Having done the temporary channel compensation, we artificially achieve equity between the transient incoming and the transient outgoing frames from the point of parity check, thus terminating the process of shut down at this transient frame and allowing "normal" functionality of the network domain to be restored from the next incoming frame. For example, if the network domain of interest is a Tandem Connection which has been shut-down, the next frame f(t+1) already does not include additional information in a temporary channel C(byte N), and no compensation functions will be required (neither in the B byte, nor in the N byte), thus the parity check provided over the transient frame and the following frames will not bring up any errors caused by the shutdown process.

What is claimed is:

1. A method for preventing errors in transmission of a telecommunication signal via a network domain forming part of a network; wherein said signal is transmitted in the form of a succession of binary data frames via two border points in said network domain, each of the frames comprising a parity array including one or more bits assigned for parity check and a temporary use array including a number of bits assigned to serve one or more temporary data channels between the two border points, the method comprising:
transmitting, via said temporary data channels, additional information between the two border points while performing operation for parity compensation at each of the border points, in the parity array of each of the binary frames,
obtaining an external command to cease transmission of the additional information via said temporary data channels, and
executing said external command while performing a procedure for temporary channels compensation at each of the border points.

2. The method according to claim 1, wherein the procedure for the temporary channel compensation includes:
selecting a transient frame,
performing said operation for parity compensation in the transient frame, and
compensating the temporary channels in the transient binary frame,
while executing said external command in a frame following the transient frame.

3. The method according to claim 2, utilizing said temporary use array of said transient frame for the temporary channel compensation.

4. The method according to claim 1, wherein said operation for parity compensation comprises compensating the parity array of a particular said frame outgoing from one of the border points with a binary difference, introduced at said border point in a frame preceding said particular frame.

5. The method according to claim 4, comprising utilizing the binary difference which has been used for parity compensation of the transient frame, for the temporary channel compensation of the transient frame:

$$C'_{(t)} = C_{(t)} \oplus B_{(t)} \oplus B'_{(t)}, \text{ or } C'_{(t)} = C_{(t)} \oplus [\Delta(t-1)],$$

where:

⊕—is Exclusive OR operator;

$C_{(t)}$—is a value in the temporary use array of the corresponding outgoing transient frame;

$C'_{(t)}$—is a vlaue in the temporary use array of the corresponding outgoing transient frame;

$B_{(t)}$—is a parity value in the parity array B of the incoming transient frame;

$B'_{(t)}$—is a parity value in the parity array B of the outgoing transient frame, and wherein this parity value is already compensated;

[$\Delta(t-1)$]—is a binary difference introduced at a border point in a frame, preceding the transient frame.

6. The method according to claim 1, comprising performing said procedure of temporary channel compensation in a first complete frame passing via a particular one of said border points after said external command is obtained; said first complete frame being considered a transient frame.

7. The method according to claim 1, wherein said signal is an SDH or a SONET signal.

8. The method according to claim 1, wherein said network domain is a Tandem Connection (TC) network domain, said temporary use array constitutes N-byte responsible for TC functions records in the TC network domain, said parity array comprises a B-byte, and wherein said external command is a command ordering the Tandem Connection functions shutdown.

9. A network element capable of implementing the method according to claim 1.

10. The network element according to claim 9, constituting a source/sink TC element having a processor for performing TC functions and further capable of providing said procedure of temporary channel compensation of the signal upon obtaining the external command to shut down the TC functions.

11. The network element according to claim 10, adapted to perform said temporary channel compensation in N-bytes of the transient frame.

12. A network element for preventing errors in transmission of a telecommunication signal via a network domain forming part of a network; wherein said signal is transmitted in the form of a succession of binary data frames via two border points in said network domain, each of the frames comprising a parity array including one or more bits assigned for parity check and a temporary use array including a number of bits assigned to serve one or more temporary data channels between the two border points, the network element, when being placed at a particular one of said two border points, is capable of:
supporting transmission of additional information between the two border points via said temporary data channels, while performing an operation for parity compensation at said particular border point, in the parity array of each of the binary frames,
obtaining an external command to cease transmission of the additional information via said temporary data channels, and
executing said external command while performing a procedure for temporary channel compensation at said particular border point.

13. The network element according to claim 12, constituting a source/sink TC element having a processor for performing TC functions and further capable of providing said procedure of temporary channel compensation of the signal upon obtaining the external command to shut down the TC functions.

* * * * *